US008565103B2

(12) United States Patent
Santhanam

(10) Patent No.: US 8,565,103 B2
(45) Date of Patent: Oct. 22, 2013

(54) LOAD DETERMINATION IN WIRELESS NETWORKS

(75) Inventor: Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1067 days.

(21) Appl. No.: 11/609,500

(22) Filed: Dec. 12, 2006

(65) Prior Publication Data

US 2008/0137680 A1   Jun. 12, 2008

(51) Int. Cl.
*H04L 12/26*   (2006.01)

(52) U.S. Cl.
USPC ............ 370/252; 370/328; 455/453; 709/224

(58) Field of Classification Search
USPC ......... 370/241, 252, 310, 329, 431, 438, 439, 370/449, 450, 458, 459; 455/403, 414.1, 455/416, 422.1, 423, 436, 443, 450, 453, 455/456.1, 456.4; 375/224, 228; 379/1.01, 379/1.03, 1.04, 32.01, 35; 714/699, 712
See application file for complete search history.

(56) References Cited

U.S. PATENT DOCUMENTS

| 5,544,196 | A | 8/1996 | Tiedemann, Jr. et al. |
|---|---|---|---|
| 5,838,904 | A | 11/1998 | Rostoker et al. |
| 6,118,997 | A | 9/2000 | Kim et al. |
| 6,404,750 | B1 | 6/2002 | Wicker et al. |
| 6,445,925 | B1 * | 9/2002 | Kwon et al. ................ 455/446 |
| 6,631,121 | B1 * | 10/2003 | Yoon ............................ 370/329 |
| 6,674,765 | B1 | 1/2004 | Chuah et al. |
| 6,965,942 | B1 | 11/2005 | Young et al. |
| 7,082,472 | B1 | 7/2006 | Feder et al. |
| 7,272,400 | B1 * | 9/2007 | Othmer ........................ 455/453 |
| 7,313,105 | B1 | 12/2007 | Lo et al. |
| 7,664,031 | B2 | 2/2010 | Davis |
| 7,813,753 | B2 | 10/2010 | Santhanam |
| 8,046,017 | B2 | 10/2011 | Kludt et al. |
| 2002/0136929 | A1 | 9/2002 | Oikawa et al. |
| 2002/0142791 | A1 | 10/2002 | Chen et al. |
| 2002/0154653 | A1 | 10/2002 | Benveniste |
| 2002/0163929 | A1 | 11/2002 | Li et al. |
| 2003/0027580 | A1 * | 2/2003 | Goodjohn et al. ............ 455/453 |

(Continued)

FOREIGN PATENT DOCUMENTS

| EP | 0994603 | 4/2000 |
|---|---|---|
| EP | 1024606 | 8/2000 |
| EP | 1538810 | 8/2005 |
| JP | 2002232424 A | 8/2002 |

(Continued)

OTHER PUBLICATIONS

US Non-Final Office Action issued in U.S. Appl. No. 11/364,148, on Jun. 11, 2009.

(Continued)

*Primary Examiner* — Yemane Mesfin
*Assistant Examiner* — Khoa Huynh
(74) *Attorney, Agent, or Firm* — Robert O'Connell; Raphael Freiwirth

(57) ABSTRACT

Systems and methods for improving latency in a communication system are disclosed. The channel load of an access channel can be determined in one embodiment. A backoff interval can be determined based on the channel load determined. A random backoff time can be determined and the transmission of an initial access probe can be delayed for the random backoff time, wherein the backoff interval defines a range from which the random backoff time is selected.

23 Claims, 8 Drawing Sheets

(56) References Cited

U.S. PATENT DOCUMENTS

| | | |
|---|---|---|
| 2003/0087645 A1* | 5/2003 | Kim et al. ............. 455/453 |
| 2003/0189948 A1 | 10/2003 | Sashihara |
| 2003/0199252 A1 | 10/2003 | Tiedemann et al. |
| 2004/0127233 A1 | 7/2004 | Harris et al. |
| 2004/0192371 A1 | 9/2004 | Zhao et al. |
| 2004/0264423 A1 | 12/2004 | Ginzburg et al. |
| 2005/0054288 A1 | 3/2005 | Agarwal |
| 2005/0250511 A1 | 11/2005 | Xiao et al. |
| 2005/0271076 A1* | 12/2005 | Ganti et al. ............ 370/448 |
| 2006/0039281 A1 | 2/2006 | Benveniste |
| 2006/0148485 A1* | 7/2006 | Kangas et al. .......... 455/453 |
| 2007/0153719 A1* | 7/2007 | Gopal ................... 370/328 |
| 2007/0165665 A1 | 7/2007 | Gaur et al. |
| 2007/0201377 A1 | 8/2007 | Santhanam |
| 2008/0071874 A1* | 3/2008 | Roodman et al. ........ 709/206 |
| 2010/0034177 A1 | 2/2010 | Santhanam |
| 2010/0080114 A1 | 4/2010 | Ratnam et al. |
| 2011/0026409 A1 | 2/2011 | Hu et al. |

FOREIGN PATENT DOCUMENTS

| | | |
|---|---|---|
| JP | 2008541515 A | 11/2008 |
| WO | 9914869 | 3/1999 |
| WO | 02054622 | 7/2002 |
| WO | 03017621 | 2/2003 |

OTHER PUBLICATIONS

International Search Report—PCT/US07/062913, International Search Authority—European Patent Office, Jul. 2, 2007.

Written Opinion—PCT/US07/062913, International Search Authority—European Patent Office, Jul. 2, 2007.

International Preliminary Report on Patentability—PCT/US06/021384, International Search Authority—European Patent Office, Jun. 11, 2008.

US Non-Final Office Action issued in U.S. Appl. No. 11/363,670, on May 21, 2009.

International Search Report and Written Opinion—PCT/US2007/087314—ISA/EPO—Sep. 26, 2008.

\* cited by examiner

LOAD DETERMINATION IN WIRELESS NETWORKS

BACKGROUND OF THE INVENTION

1. Field

The present invention generally relates to communication systems. More particularly, the invention relates to channel load estimation in communication systems.

2. Background

The present application is related to pending application Ser. No. 11/364,148 entitled "Backoff Control for Access Probe Transmission in Communication Systems" filed on Feb. 27, 2006, the contents of which are hereby incorporated by reference in their entirety.

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xRTT, "1x". and 1xEV-DO standards, "1xEV", for example) or TD-SCDMA.

In wireless communications systems mobile terminals or access terminals receive signals from fixed position base stations (also referred to as cell sites or cells) that support communication links or service within particular geographic regions adjacent to or surrounding the base stations. In order to aid in providing coverage, each cell is often sub-divided into multiple sectors, each corresponding to a smaller service area or geographic region. An array or series of base stations placed adjacent to each other form a communication system capable of servicing a number of system users, over a larger region.

Typically, each mobile terminal monitors a control channel that can be used to exchange messages between the mobile terminal and the base station. The control channel is used to transmit system/overhead messages, whereas traffic channels are typically used for substantive communication (e.g., voice and data) to and from the mobile terminal. For example, the control channel can be used to establish traffic channels, control power levels, and the like, as is known in the art. Generally, there are two types of power control for the reverse link, open-loop and closed-loop power control. The open-loop power control typically occurs prior to the mobile terminal establishing contact with a base station. The closed-loop control occurs after the mobile and the base station are in communication and the base station can measure the received power levels and feedback power level adjustments to the mobile terminal.

In the open loop condition, the reverse link power for an initial communication signal (e.g., access probe) from the mobile terminal to the base station can be determined by monitoring specialized signals from a base station or access point. For example, in CDMA systems a pilot signal can be use to estimate the channel condition and then determine a power estimate for transmitting back to the base station. The accuracy of the channel conditions and power estimation can greatly impact performance of the system, particularly in terms of latency of the system. For example, 1x and 1xEV systems will transmit an access probe at a first power level based on a power control algorithm. If the first access attempt does not succeed, then the probe is resent at increasingly higher power levels, until it is successful or the power level maximum is reached.

The existing open-loop power control algorithm used to transmit access probes over the Access Channel in CDMA2000 1x-A and 1xEVDO networks tend to be prone to inaccuracies and can result in underestimation of transmit power for access probes. This leads to an increased loss rate of access probes over the Access Channel, particularly on the first access attempt. Accordingly, errors in the determination of the power level for the first transmission can lead to a high rate of unsuccessful first access attempts, which can cause increased system latency as the probes are resent. By limiting retransmissions of the access probes, the latency incurred by access probes can be reduced.

Another cause of failed access attempts is collision between access probes. Collisions occur when more than one mobile terminal attempts to send an access probe on the same Access Channel in the same sector. Because of the interference cause by the competing signals, the base station may not successfully receive the access probes. Accordingly, collisions are another factor that can impact the latency of a communication system. To address the problem of collisions, some conventional systems will generate a random backoff time to prevent collisions on subsequent retransmissions. However, conventional systems do not address potential collisions with the first access probe. Accordingly, system latency can also be impacted by collisions on the initial access probe attempt. Additionally, since the probability of collisions increases with increased channel loading, it would be beneficial to know the instantaneous channel load. However, conventional systems do not estimate the channel loading.

SUMMARY OF THE EXEMPLARY EMBODIMENTS

Exemplary embodiments of the present invention are directed to a system and method for channel load estimation in a communication system.

Accordingly, an embodiment of the invention can include a method comprising: estimating a channel load based on a number of load related messages on a control channel in a predetermined interval.

Another embodiment of the invention can include an apparatus comprising: logic configured to estimate a channel load based on a number of load related messages on a control channel in a predetermined interval.

Another embodiment of the invention can include a method comprising: transmitting channel load related information to an access terminal, wherein the channel load related information is at least one of a number of page arrivals in a given sector, a number of members in a group, a number of members in a multicast group call, a number of targets, and a number of contiguous sectors containing the targets.

Another embodiment of the invention can include a system comprising: means for transmitting channel load related information to an access terminal, wherein the channel load related information is at least one of a number of page arrivals in a given sector, a number of members in a group, a number of members in a multicast group call, a number of targets, and a number of contiguous sectors containing the targets.

Another embodiment of the invention can include a computer readable media embodying a method for determining channel load, the method comprising: estimating a channel load based on a number of load related messages on a control channel in a predetermined interval.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
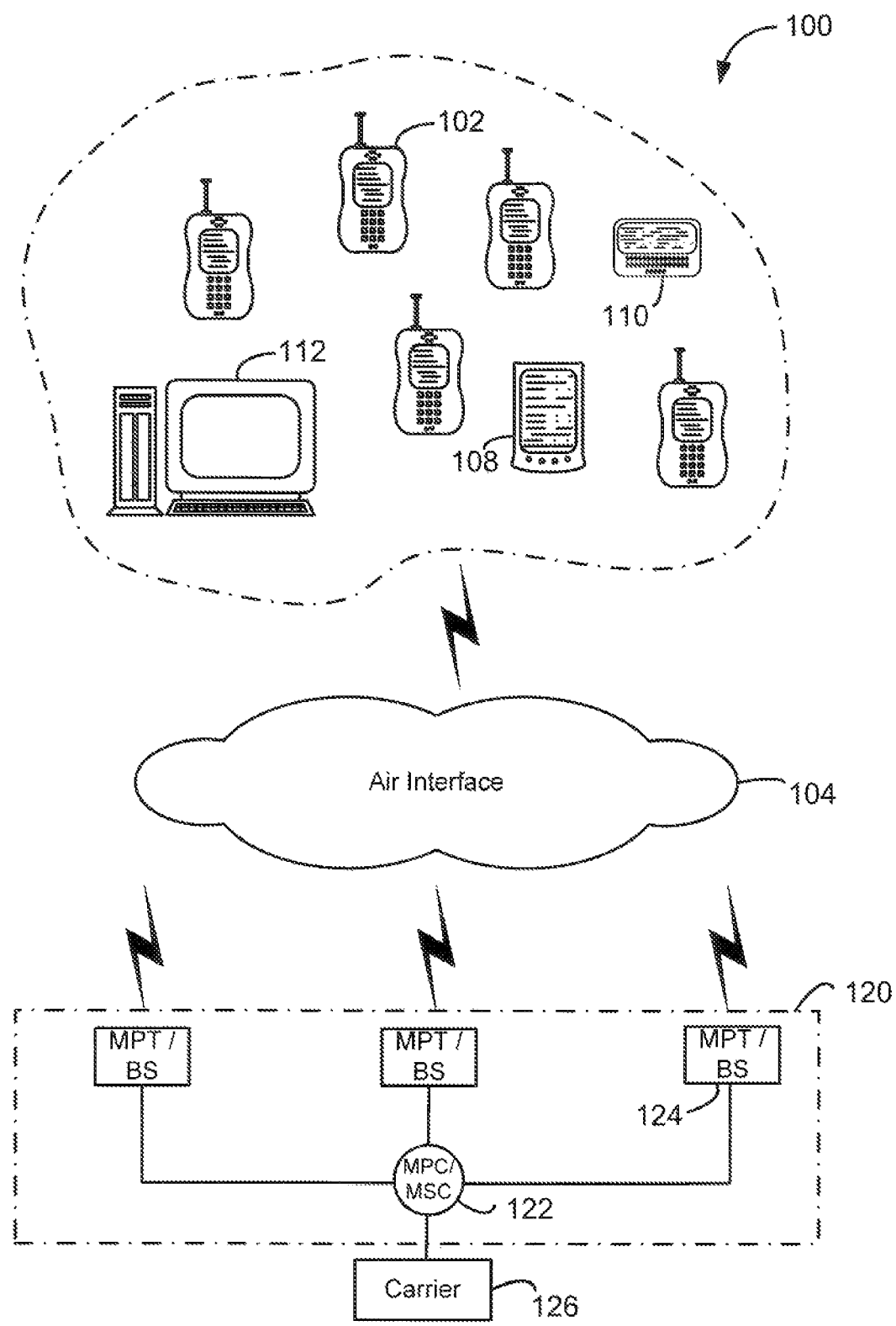
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) base station transceivers (BTS), base stations (BS) or more generally access points. An access terminal transmits and receives data packets through one or more modem pool transceivers to an HDR base station controller, referred to as a modem pool controller (MPC), base station controller (BSC) and/or mobile switching center (MSC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein generally the term traffic channel can refer to either a forward or reverse traffic channel.

Additionally, although exemplary embodiments of the invention are described in terms of a wireless system and specific technologies such as CDMA 1× and 1×EV system, those skilled in the art will appreciate that the invention is not limited to the illustrated systems. For example, embodiments of the invention can include any system that can utilize load determination on a specific channel within the access network. Those skilled in the art will appreciate that signals transmitted over many mediums can be considered to have channel parameters and may be impacted by channel loading. For example, signals over wireline systems, such as copper wire, coaxial cable, fiber optic cables, and the like have channel parameters that can be affected by transmission/modulation frequency, modulation technique, noise sources, cross talk, medium characteristics, and the like.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably. Further as used herein the terms "access point", "modem pool transceiver (MPT)", "base transceiver station (BTS)", "base station (BS)" and like variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, wireless network carrier 126, a core network, the Internet, and/or other remote servers.

The RAN 120 controls messages (typically sent as data packets) sent to a MPC/MSC 122. The carrier network 126 may communicate with the MPC/MSC 122 by a network, the Internet and/or a public switched telephone network (PSTN). Alternatively, the MPC/MSC 122 may connect directly to the Internet or external network. Typically, the network or Internet connection between the carrier network 126 and the MPC/MSC 122 transfers data, and the PSTN transfers voice information. The MPC/MSC 122 can be connected to multiple base stations (BS) or modem pool transceivers (MPT) 124. In a similar manner to the carrier network, the MPC/MSC 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, MPC/MSC 122 and other components may form the RAN 120, as is known in the art. However, alternate configurations may also be used and the invention is not limited to the configuration illustrated.

Figure 2:
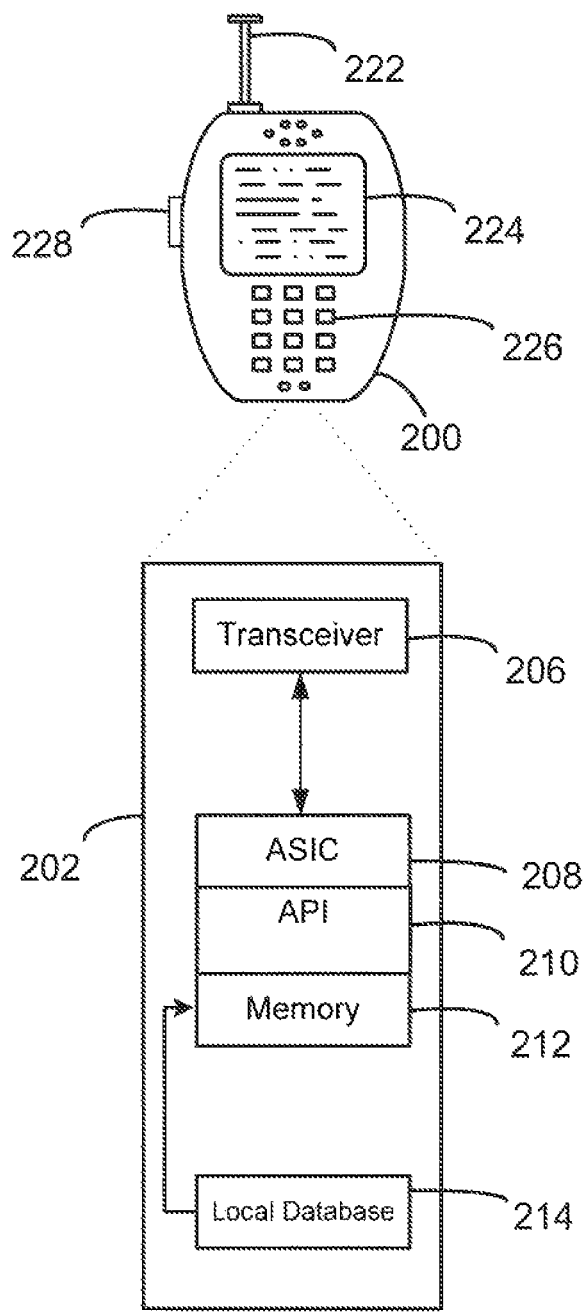
FIG. 2 is an illustration of an access terminal in accordance with at least one embodiment of the invention.

Referring to FIG. 2, the access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein, such as channel load estimation. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 2 are to be considered merely illustrative and the invention is not limited to the illustrated features or arrangement.

As used herein "access terminal" includes, for example, one or more processing circuits executing resident configured logic, where such computing devices include, for example, microprocessors, digital signal processors (DSPs), microcontrollers, or any suitable combination of hardware, software and/or firmware containing processors and logic configured to at least perform the operations described herein. Some examples of access terminals or wireless devices which may be used in accordance with embodiments of the present invention include cellular telephones or other wireless communication units, personal digital assistants (PDAs), paging devices, handheld navigation devices, handheld gaming devices, music or video content download units, and other like wireless communication devices.

The wireless communication between the access terminal 102 and the RAN 120 can be based on different technologies, such as code division multiple access (CDMA), time division multiple access (TDMA), frequency division multiple access (FDMA), the Global System for Mobile Communications (GSM), or other protocols that may be used in a wireless communications network or a data communications network. The data communication is typically between the client device 102, MPT/BS 124, and MPC/MSC 122. The MPC/MSC 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN 120 after traffic channels have been established.

Initial Random Backoff

As previously discussed conventional systems do not perform a random backoff during the initial transmission of the access probe. Accordingly, the probability of collisions on the initial access probe is greater than in subsequent access attempts. Additionally, to further enhance the probability of the access probe being successfully completed, the random backoff can be optimized based on the channel load. Both of these aspects and other aspects of embodiments of the invention will be discussed in the following description.

Collisions can occur on the Access Channel whenever two or more access probes start transmitting at the same time. This can be particularly probable in a geographically dense call region (e.g., in a group communications network). For example, in a group communications network, a large number of access terminals may be simultaneously paged and attempt to access the network, such as in CDMA2000 1× when a large number of access terminals transmit the 8026 Page Response following a jump-to-hyperspace operation. In general the jump-to-hyperspace operations refers to 1× access terminals that get a page message and attempt to get synchronized with respect to each other within a time window (e.g., in a 80 or 160 msec. window of time) when transmitting the page response message.

The dependence of collision probability on the load on the Access Channel and the random backoff interval can be determined in closed-form. These results can be used in the development of an adaptive backoff algorithm that ensures successful delivery of access probes over the Access Channel.

Figure 3A:
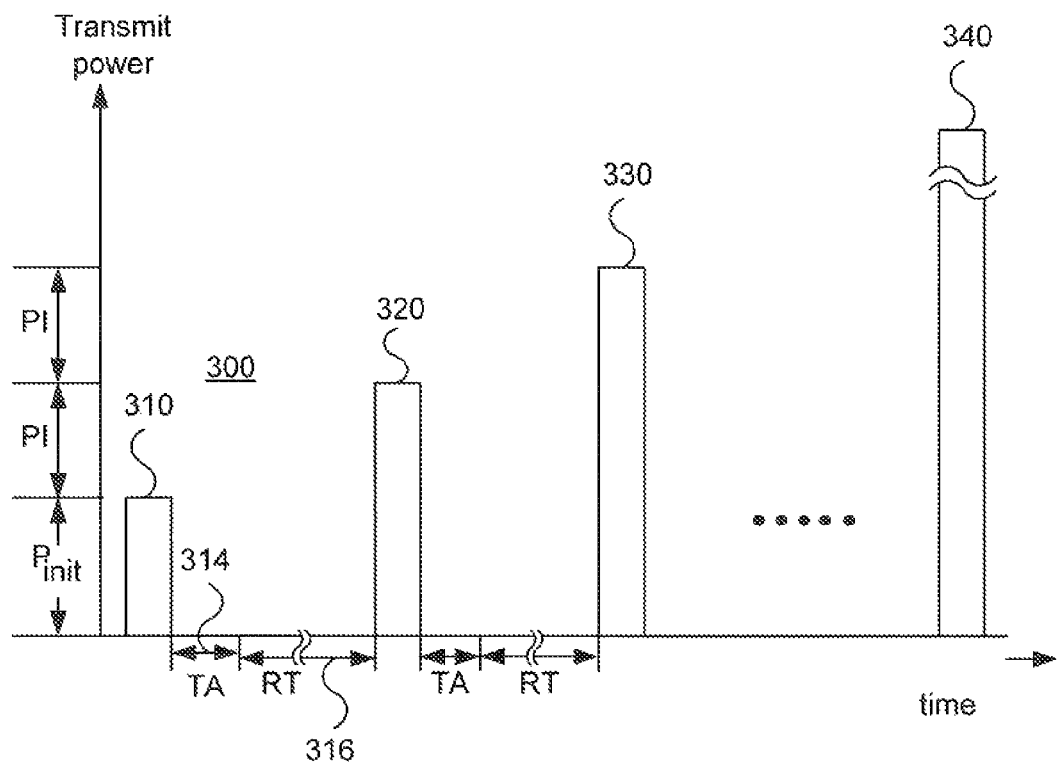
FIGS. 3A and 3B are illustrations of access probe sequences for various transmissions.

For comparison to embodiments of the present invention, a conventional sequence of access probes 300 is illustrated in FIG. 3. The first probe 310 is transmitted at an initial power (Pinit or IP) during a first Access Channel slot. The probe waits for acknowledgement from the access point (e.g., base station) or for an acknowledgement timeout 314 to occur. Then, a random backoff time 316 is determined before the next access probe 320 is sent. As illustrated the second access probe 320 and subsequent access probes 330 and 340, will be sent using increasingly higher transmit powers until an acknowledgement is received, a maximum power is reached or the access process timeout occurs.

Figure 3B:
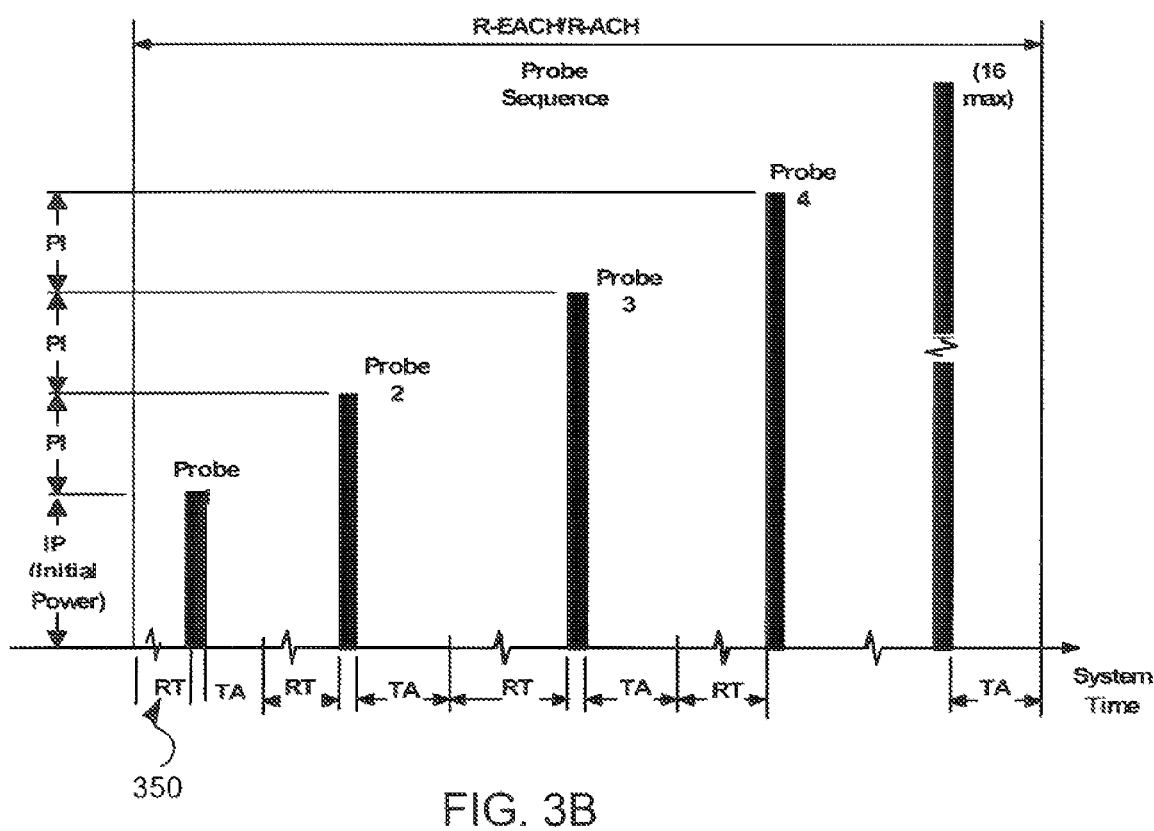

A reference diagram that illustrates an exemplary access procedure over the Access Channel in accordance with at least one embodiment of the invention is illustrated in FIG. 3B. As illustrated, an exemplary access procedure for embodiments of the invention differs from the standard-specified procedure in one aspect in that a random backoff operation 350 is performed even before the transmission of the first access probe.

For example, let N denote the number of access terminals that have a probe to transmit over the Access Channel at time t=0 (e.g., channel load). Each access terminal randomly defers its transmission by RT access cycle durations where $0 \le RT \le D-1$. The random backoff time RT can take integer values and can be uniformly distributed in the interval [0, D-1]. In one embodiment, D can be fixed to a pre-specified value. In this case, two probes will only collide with each other if their random backoff times RT are the same on the first access attempt. Collisions can also occur on subsequent access attempts if the access probes transmissions start at the same time.

Accordingly, the probability of Q probes colliding in exactly V slots can be denoted as $P_V^Q(N,D)$. The number of collisions in each of these K slots can be given as $I=\{i_1, i_2, \ldots i_V\}$, where $i_1, i_2, \ldots i_V = Q$. Then, $$P_V^Q(N, D) = \sum_{i_1, i_2, \ldots i_V} \frac{Q!}{i_1!, i_2!, \ldots i_V!} \frac{N!}{Q!(N-Q)!} \frac{D!}{V!(D-V-(N-Q))!} \frac{1}{D^N},$$

or simply, $$P_V^Q(N, D) = \sum_{i_1, i_2, \ldots i_V} \frac{1}{V!} \frac{N!}{i_1!, i_2!, \ldots i_V!(N-Q)!} \frac{D!}{(D-V-(N-Q))!} \frac{1}{D^N}$$

For a collision to take place in a slot, at least two probes have to be transmitted. Therefore, $i_V \ge 2$ for all v=[1, V] and $V \le Q/2$.

To facilitate an understanding of the following disclosure definitions for various terms used therein will be provided. For example, the delay incurred by the first successful access probe out of N access probes is denoted by Minimum_Delay. Note that the minimum delay will impact latency sensitive applications. The delay incurred by the last successful access probe out of N access probes is denoted by Maximum_Delay. The 50th and 80th percentile delay are defined as the delay experienced by the (N/2) and (0.8N) successful access probe, respectively. The terms ProbeBackoff and D may be used interchangeably, where ProbeBackoff=D-1.

Additionally, the following variable terms will be used in the equations presented herein.

N denotes the number of access terminals that have a probe to transmit over the Access Channel at time t=0. Each access terminal defers its transmission randomly by RT access cycle durations where $0 \le RT \le D-1$. The random backoff time RT takes integer values and is uniformly distributed in the interval [0, D-1].

$D_{max}$ denotes a system-specific pre-determined value that upper-bounds the value of D.

V denotes the number of access cycle durations in which a "collision event" takes place when N access probes contend to transmit over the Access Channel. A "collision event" is said to occur whenever two or more access probes start transmitting in the same access cycle duration.

Q denotes the number of access probes that collide in V "collision events". Accordingly, $0 \le Q \le N$.

R denotes the minimum number of successful access probes on the first access attempt when N probes that are synchronized with respect to each other contend for transmissions over the Access Channel.

$P_0$ denotes the minimum probability of success of R access probes on the first access attempt when N access probes contend to transmit on the Access Channel.

$L_{max}$ denotes a pre-determined value that constrains a delay metric that defines the success of one or more access probes of a total of N access probes.

$P_V^Q(N,D)$ denotes the probability of Q probes colliding in V collision events when N access probes begin access procedures at the same time and defer their probe transmission by a random amount of time (in the interval [0, D-1] Access Cycle durations) prior to the first access attempt.

The delay incurred in transmitting access probes over the Access Channel can be analyzed as a function of the load on the Access Channel for different settings of D. The delay incurred by the first successful access probe out of N access probes is denoted by Minimum_Delay. The delay incurred by the last successful access probe out of N access probes is denoted by Maximum_Delay.

Figure 4A:
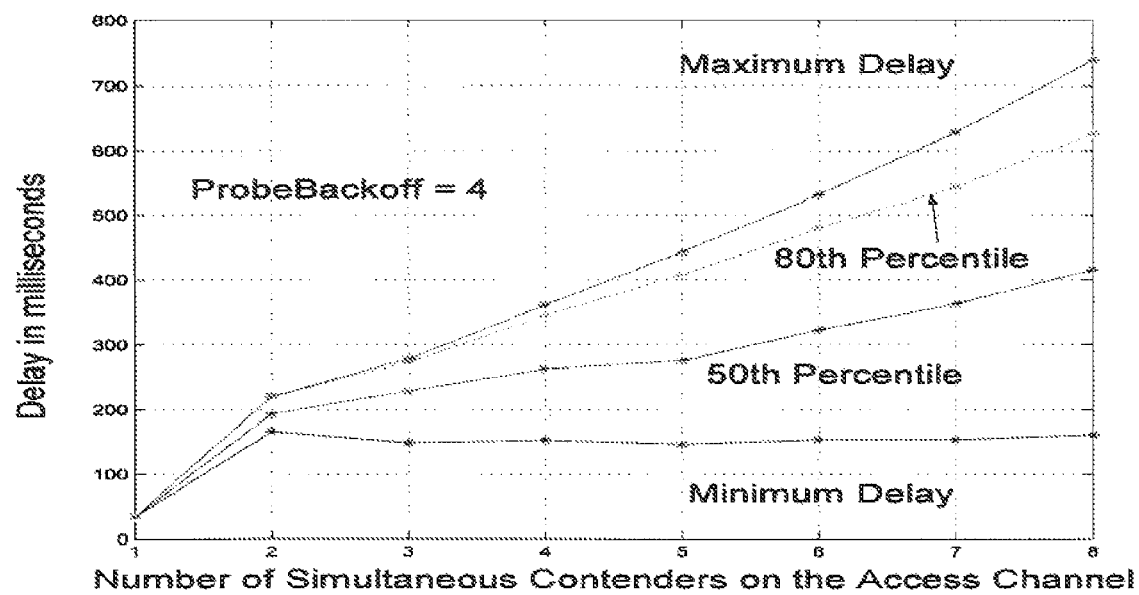
FIGS. 4A and 4B are graphs illustrating delays for various numbers of simultaneous contenders on the Access Channel.

FIG. 4A illustrates the Minimum_Delay, Maximum_Delay, the 50th percentile and the 80th percentile delay as a function of N for a default setting in a 1×EVDO network. Each data point in FIG. 4A was computed by averaging over 500 runs. For the case of N=1, the Minimum_Delay=33.33 msec which is the lowest possible value since the preamble+payload is equal to 20 slots. The Minimum_Delay is approximately 150~160 msec for all values of N>2. This is because in the default setting, the first access attempt always results in a collision because there is no random backoff before the first attempt. Since the first successful probe is generally successful in the second access attempt, the average value of Minimum_Delay=2*(Preamble+Payload)+ACMProbeTimeout+ 0.5*ProbeBackoff*AccessCycleDuration+Alignment with the nearest cycle boundary, which can be determined as:

Minimum_Delay=2*33.33+26.67+0.5*4*26.67+ 12*1.67=166 msec.

Alignment with the nearest Access Cycle boundary can result in an additional delay of 12 slots. Additionally, the average delay incurred as a result of performing a random backoff is not always equal to:

Avg_delay=0.5*ProbeBackoff*AccessCycleDuration slots.

It can be considered a function of the backoff interval length and is typically less than the value of 0.5*ProbeBackoff*AccessCycleDuration for D>N.

Figure 4B:
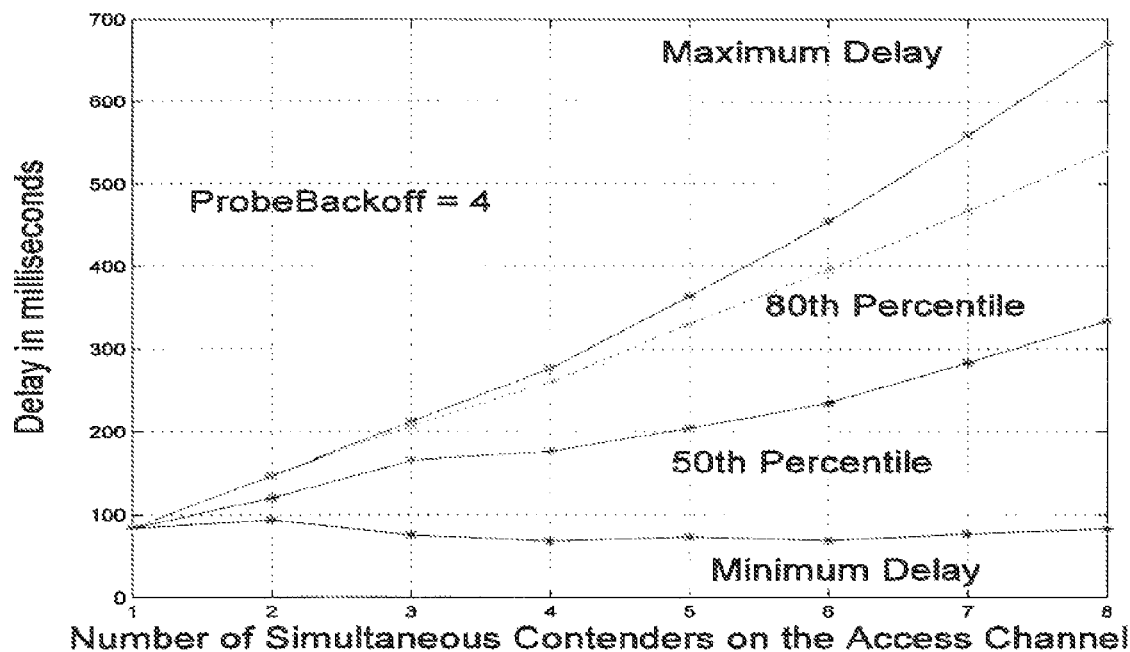

FIG. 4B illustrates the Minimum_Delay, Maximum_Delay and the 50th and 80th percentile delay as a function of N for an alternate setting wherein D=5 prior to each access attempts (including retransmissions). Each data point in FIG. 4B was also computed by averaging over 500 runs. For the case of N=1, the Minimum_Delay=33.33+56 msec. This value is higher than the corresponding value for the default setting because performing a random backoff prior to the first access attempt can result in an additional delay of 0.5*ProbeBackoff (=32) slots which is equal to 53.34 msec. Accordingly, performing a random backoff for the case of N=1 is not advantageous in terms of delay.

However for all values of N≥2, we find that the first successful access probe incurs an average delay of 87 msec which is significantly less than 166 msec. This is because performing a random backoff operation prior to the first access attempt results in a significant decrease in Access Channel collision probability and as a result at least one access probe is generally successful in the first access attempt. Following the first access attempt, both these experiments (FIGS. 4A and 4B) depict identical behavior as ProbeBackoff=4 for all retransmissions in either case.

The Minimum_Delay value directly affects the initial latency of the system. Accordingly, in latency sensitive applications, such as group communications, the initial latency should be minimized as much as possible. Additionally, for the group communications applications and other latency sensitive applications, the 50th percentile delay should be considered, as it can impact some target access terminals and cause loss of some initial media traffic.

Figure 5A:
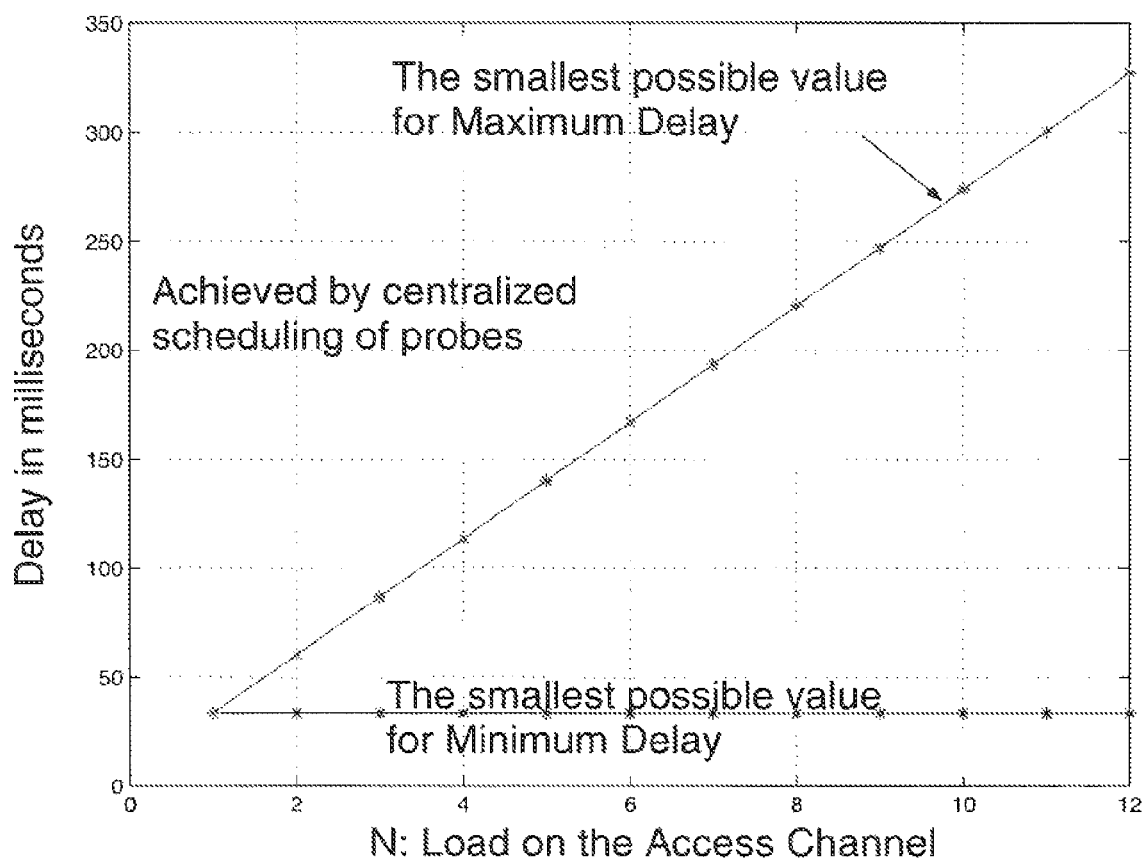
FIG. 5A is a graph illustrating the minimum delay and smallest maximum delay for various loads on the Access Channel.

Referring to FIG. 5A, the minimum and maximum values of delay in transmitting N access probes are illustrated. Using FIG. 5A, the best achievable delay (e.g., achieved by centralized scheduling) can be ascertained. For example, comparing the delay achieved in experiments 1 and 2 (FIGS. 4A and 4B) to the smallest possible value as shown in FIG. 5A, the Minimum_Delay achieved in experiment 2 is approximately 2.6 times higher than the best possible value for all values of N≥2. The Maximum_Delay in experiment 2 is approximately 2.2 times its smallest possible value for large values of N. In fact, the 50th percentile delay in experiment 2 is very close to the smallest possible value of Maximum_Delay (in FIG. 5A) for all values of N. The delay provisioned by the randomized backoff algorithm is within a factor of 2~2.5 of the theoretical lower bound.

Further details regarding the initial random backoff algorithm and the effect of the ProbeBackoff/D can be found in co-pending U.S. patent application Ser. No. 11/364,148, filed on 27 Feb. 2006, entitled "BACKOFF CONTROL FOR ACCESS PROBE TRANSMISSION IN COMMUNICATION SYSTEMS", by the present inventor and assigned to the same assignee, which is hereby incorporated by referenced in its entirety.

Those skilled in the art will appreciate from the foregoing disclosure that the value of the random backoff interval can affect the delay experienced by access probes over the Access Channel. It can also be appreciated that the value of the backoff interval should be generally set to a higher value when N is high and to a smaller value when N is low. Setting the backoff interval to [0, N−1], Access cycle durations can increase the probability of success of an access probe within the initial five access cycles to 95% (true for N>3). Such a setting may be appropriate for group communication systems (e.g., push-to-talk systems, QChat Group calls) as the Initial delay is typically determined by the arrival of the first ANNOUNCE_ACK. Therefore using the setting of D=N (or N−1) can yield optimal performance with regards to minimizing the Minimum_Delay as well the 50th percentile delay and Maximum_Delay, as discussed above, which can improve the initial delay. Further, according to embodiments of the invention, the random backoff procedure can be used prior to each access attempt. Still further, embodiments of the invention can be implemented at the access terminal either at the application layer or at the MAC layer.

Estimating the Load on the Access Channel

Those skilled in the art will appreciate from the foregoing discussion, that the load on the access channel N significantly impacts the potential for Access Probe collisions. Further, it was established that performing a random backoff procedure over the interval determined as a function of N (e.g., [0, N−1]) access cycles will minimize the average value of the Minimum_Delay. This was also verified via simulations. It was also shown that the Minimum_Delay was not very sensitive to inaccurate estimates of the load on the access channel for large values of N (>5). However, it was also shown via simulations that for small values of N (2<N<5), an underestimation in N can lead to higher delay. Accordingly, accurate estimates of the load (N) on the access channel for each probe transmission can be used in determining the initial random backoff interval and for other load dependent system optimizations, which can improve system performance.

In this section, embodiments of the invention that estimate the load (N) for a particular transmission on the access channel are described. In one embodiment, a distributed algorithm can determine an estimate of N by monitoring information on a channel in the network. For example, the number of pages transmitted in a control channel (CC) packet (e.g., a synchronous control channel (SCC) packet) every page cycle (e.g., 426 or 213 milliseconds) can be monitored. Pages transmitted on the control channel are generally for new calls for targets spread across a paging zone. Assuming that targets in a call are spread uniformly across sectors in a paging zone, each access terminal can determine the average number of targets located in its sector. This information can be used to determine an estimate of load within the access terminal's sector. This is explained in greater detail in the following section.

The following example is provided solely for purposes of illustration and the invention is not limited to the specific values, assumptions, channels, and systems discussed herein. Assume that the target of a call is equally likely to be in one of M sectors. Further, assume K pages are seen on the Control Channel MAC packet during a paging cycle. Then, the average number of pages destined to a given sector can be given as K/M.

In sectors where no pages are destined, the access terminals will enter the IDLE state. Access terminals that receive a page will respond by transmitting a page response message (e.g., in CDMA a L2ACK message). Therefore, the load on the access channel can be determined by those access terminals that receive a page amongst the K pages that arrive in the control channel (CC) packet.

The probability of receiving j pages in a sector in which at least one page is destined is given by:

$$Pr(J = j || j \geq 1) = \left(\frac{1}{1-\left(1-\frac{1}{M}\right)^K}\right)\left\{\frac{K!}{j!(K-j)!}\left(\frac{1}{M}\right)^j\left(\frac{M-1}{M}\right)^{K-j}\right\}.$$

The expected average targets $E_{avg}^{targ}$ in a sector is given by:

$$E_{avg}^{targ} = 1 + \left(\frac{1}{1-q^K}\right)\left\{\sum_{j=2}^{K} jPr(J = j || j \geq 1)\right\}$$

$$= \frac{K}{M}\left(1 - \frac{q^{K-1}}{1-q^K}\right)$$

and:

$$q = 1 - 1/M.$$

In the foregoing analysis it is assumed that the target of an incoming call is equally likely to be in one of M sectors. It is possible that the value of M may not be known to the access terminal apriori. It is also possible that the value of M may be large enough to make the load estimation algorithm less effective. In such cases, an alternative technique to predicting the probability can be employed as discussed in the following sections.

When M is large or unknown, an alternative technique can be used to determine the probability of page arrival within a sector. The average probability of a page arrival into a sector can be determined by taking into account prior samples of the probability of page arrival into the sector. For example, denoting the number of actual page arrivals in a given sector during a Control Channel (CC) cycle s as $r_s$ and the total number of pages that arrive during CC cycle s as $K_s$, the average probability of arrival during CC cycle s+1, denoted by $p_{s+1}$, can be determined as follows:

$$p_{s+1} = \frac{1}{s}\left(\sum_{i=1}^{s} \frac{r_s}{K_s}\right).$$

Alternatively, $p_{s+1}$ can be determined by using an auto-regressive moving average (ARMA) technique. For example, an ARMA technique used for determining $p_{s+1}$ can be given as:

$$p_{s+1} = \alpha p_s + (1-\alpha)\left(\frac{r_s}{K_s}\right),$$

where α is a scalar value defined as $0 \leq \alpha \leq 1$. Those skilled in the art will appreciate other (e.g., higher order) equations can be used and embodiments of the invention are not limited to the equation given above.

Accordingly, the load on the access channel following CC cycle s can be determined as:

$$E_{avg}^{targ} = E_{avg}^{targ,s+1}$$

$$= \left(\frac{1}{1-(q_{s+1})^K}\right)\left\{\sum_{j=2}^{K} jP(J_{s+1} = j || j \geq 1; p_{s+1})\right\}$$

$$= \frac{K}{M}\left(1 - \frac{(q_{s+1})^{K-1}}{1-(q_{s+1})^K}\right)$$

where, $$P(J_{s+1} = j || j \geq 1; p_{s+1}) = \left(\frac{1}{1-(q_{s+1})^K}\right)\left\{\frac{K!}{j!(K-j)!}(p_{s+1})^j(q_{s+1})^{K-j}\right\}$$

and $q_{s+1} = 1 - p_{s+1}$.

Using this approach, the RAN can provide feedback information (e.g., $r_s$) to the access terminals in a given sector every CC cycle, where $r_s$ is the number of page responses received from the access terminals in that sector during the prior CC cycle.

In addition to page responses, the access channel may also experience loading due to access terminal originated calls, for example. Assuming that calls (or other loading activities) are placed by an access terminal in a given sector at a rate of λ calls per second, and the duration of the access cycle is $T_{acc}$ in seconds and further assuming that there are W access terminals registered within the sector at a given instant in time, the load on the access channel due to access terminal originated calls ($E_{avg}^{orig}$) can be determined as:

$$E_{avg}^{orig} = W\lambda T_{acc}.$$

For example, using the foregoing equation with a nominal call rate of 1.45 calls/hour, 1000 registered access terminals per sector and an access cycle duration of 26.67 ms yields the following:

$$E_{avg}^{orig} = 1000 * \frac{1.45}{3600} * 0.027 = 0.011.$$

Those skilled in the art will appreciate that other activities in the sector may contribute to access channel loading and may be included in the value λ. For example, gaming applications, streaming media, data services, registrations, transmissions of route update messages, and the like may increase the value of λ. Accordingly, the value of λ can be adjusted to take into account all activities in a sector that use the access channel.

The foregoing discussions looked at target and originating loading on the access channel. Accordingly, the cumulative load on the access channel can be determined as the combination of both given as:

$$E_{avg}^{total} = [E_{avg}^{orig} + E_{avg}^{targ}].$$

If the average number of retransmissions (not including the first attempt) over the access channel is RT, then the total load on the access channel can be determined as:

$$E_{avg}^{total} = [(1+RT)*(E_{avg}^{orig} + E_{avg}^{targ})].$$

Accordingly, a value of N (i.e., load on the access channel) can be estimated prior to each transmission. This value can be used to establish a probe backoff interval that can be used to increase the probability of a successful probe transmission and reduce system delays.

It is possible that targets in a group call are not uniformly distributed across an entire paging zone but are likely to be co-located within a sector with high probability. In such cases, the number sectors over which K pages are distributed can be assumed to be much smaller, e.g., M=10. In this case, we find that $E_{avg}$=1.2. Therefore, the estimated load in each sector for the Group call will be N=2.2. For example, N can be calculated as N=1+$E_{avg}$ so an additional offset is added to the calculated channel load or the calculated channel load can be used directly, as will be appreciated by those skilled in the art. Using this value of N, an appropriate value for D can be determined at the target access terminal in each sector. For example, those skilled in the art will appreciate that the value of N can be rounded up to the nearest integer (e.g., using a CEIL or similar function). This integer value can be used directly in the case of D=N for the purposes of establishing the random backoff interval.

Assuming that group calls exhibit a characteristic of having target access terminals concentrated in a few sectors within a paging zone as compared to direct calls, each target access terminal can have the ability to distinguish whether the pages that it "sees" in a CC capsule belong to a direct call or a Group call. This can be used to estimate the load on the Access channel. A technique to distinguish group calls from direct calls is described in the following subsection.

Technique to Distinguish a Group Call from Direct Calls

A distinguishing characteristic of a group call is that it typically will cause a large number of pages to be transmitted in a packet over the Control Channel in each sector within a paging zone in quick succession. In contrast, direct calls even during a busy hour, will seldom cause more than 5 pages to be transmitted in a Control Channel (CC) packet. Therefore, if an access terminal notices a large number of pages (e.g., 6 or more) in a CC packet, it can conclude with very high accuracy that a group call (or multiple group calls) is being placed along with Direct Calls. To see this, consider the following example using the following assumptions:

Average number of registered users in a sector per carrier=333

Average number of Direct calls per user during a busy-hour according to empirical data is approximately 1.45

Size of a paging zone=50 sectors. This value could be even smaller when using location based paging.

Total number of paging zones in a network=M

The target of a call made by an access terminal in a given paging zone is equally likely to be present in any of the M paging zones.

Using the foregoing assumptions, it can be shown that the average number of calls arriving into a paging zone is equal to the average number of calls that emanate from within a paging zone. Accordingly, the average number of calls that emanate from within a paging zone (AvgCallsPZ) can be determined as:

AvgCallsPZ=(333*1.29*50)/3600=6.7 calls/second.

Figure 5B:
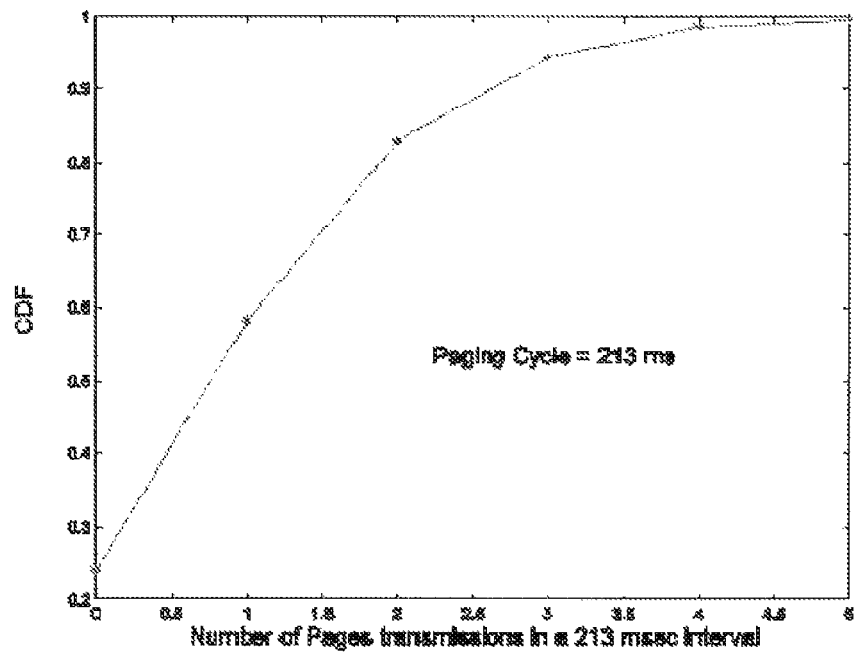
FIG. 5B is a graph illustrating the CDF of K pages being transmitted in a Control Channel Capsule/Packet.

Therefore, the average number of calls arriving into a paging zone which is also the average number of pages (e.g., SO8026 pages) per sector zone per second is equal to 6.7 pages/second. Assuming a Poisson call arrival model (typical for voice calls) and denoting the probability of K pages transmitted by P(K) (e.g., over a physical layer packet correspond to calls that arrived within the last 213 msec), the CDF of K pages being transmitted in a Control Channel Capsule is illustrated in FIG. 5B.

Accordingly, the probability of 5 or more back-to-back pages is extremely low (<1%). As a result, it is possible to conclude with a high statistical probability that a Group Call is incident along with Direct calls whenever more than 5 pages are seen within a Control Channel physical layer packet. Based on this determination of whether the call belongs to a Direct call or is part of a Group call, an appropriate model can be used to determine the instantaneous load on the Access Channel.

Additionally, it is possible that some of the K pages in a CC capsule could belong to direct calls while others belong to a group call. However, since the call arrival rate for group calls is relatively low in comparison to direct calls, the probability of this event is expected to be relatively low and can be disregarded for estimating the channel loading.

Figure 6:
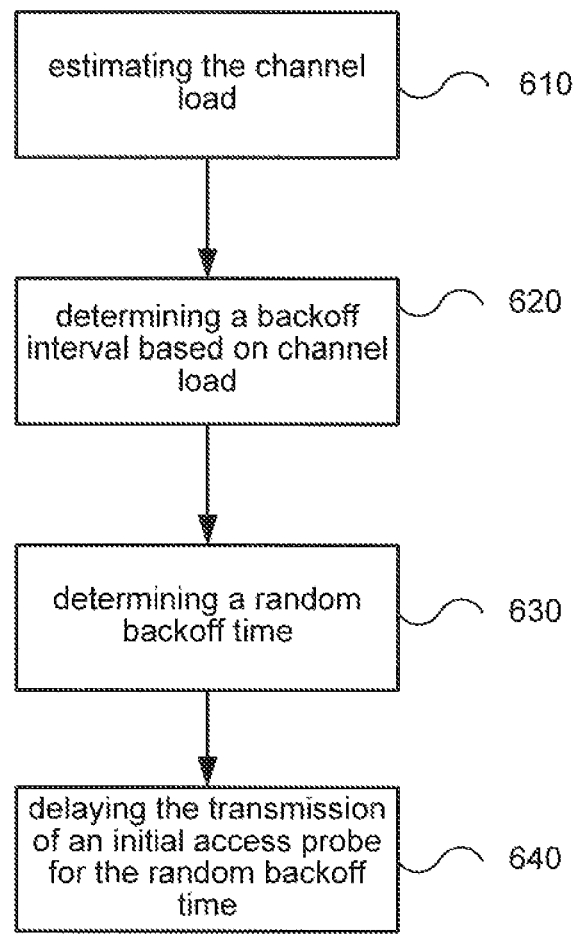
FIG. 6 is a flowchart of a method in accordance with at least one embodiment of the invention.

In view of the foregoing disclosure, those skilled in the art will recognize that embodiments of the invention include methods of performing the sequence of actions, operations and/or functions previously discussed. For example, as illustrated in FIG. 6, at least one embodiment includes a method comprising estimating a channel load based on a number of load related messages on a control channel in a predetermined interval, 610. The number of load related messages is determined as a number of control channel (CC) packets and the predetermined interval is every page interval.

Further the number of load related messages can be a number of pages (K) and estimating the channel load ca further include determining a number of sectors (M) in a paging zone; and determining a probability of targets (j) in a designated sector, such as discussed above.

Referring to FIG. 6, the method can further include determining a backoff interval based on the estimated channel load, 620. The random backoff time can be determined 630, where the backoff interval defines a range from which the random backoff time is selected. Additionally, the transmission of an initial access probe can be delayed for the random backoff time 640. Accordingly, the channel load estimation can be used to reduce the system latency due to access probe collisions as discussed above. For example, the backoff interval can be determined as [0, N−1] access cycles, where N is the estimated channel load and access cycles is an interval for a channel that is used to transmit the access probe.

As discussed in the foregoing, embodiments of the invention can improve system latency which can benefit all applications but is particularly important to delay sensitive applications. A group communication system is an example of a delay sensitive system that can take advantage of reduced connection times offered by embodiments of the invention disclosed herein. The group communication system may also be known as a push-to-talk (PTT) system, a net broadcast service (NBS), a dispatch system, or a point-to-multi-point communication system. Typically, a group of access terminal users can communicate with one another using an access terminal assigned to each group member. The term "group member" denotes a group of access terminal users authorized to communicate with each other. Although, group communication systems/PTT systems may be considered to be among several members, the system is not limited to this configuration and can apply to communication between individual devices on a one to one basis.

The group may operate over an existing communications system, without requiring substantial changes to the existing infrastructure. Thus, a controller and users may operate in any system capable of transmitting and receiving packet information using Internet protocol (IP), such as a Code Division Multiple Access (CDMA) system, a Time Division Multiple Access (TDMA) system, a Global System for Mobile Communications (GSM) system, satellite communication systems, combinations of land line and wireless systems, and the like.

Group members may communicate with each other using an assigned access terminal (AT), such as ATs 102, 108, and 112. The ATs may be wireline or wireless devices such as terrestrial wireless telephones, wireline telephones having push-to-talk capability, satellite telephones equipped with push-to-talk functionality, wireless video cameras, still cameras, audio devices such as music recorders or players, laptop or desktop computers, paging devices, or any combination thereof. Furthermore, each AT may be able to send and receive information in either a secure mode, or a non-secure (clear) mode. It should be understood that reference to an access terminal is not intended to be limited to the illustrated or enumerated examples, and may encompass other devices that have the capability to transmit and receive packet information in accordance with the Internet Protocol (IP).

When a group member wishes to transmit information to other members of the group, the member may request the transmission privilege by pressing a push-to-talk button or key on an AT, which generates a request formatted for transmission over a distributed network. For example, the request may be transmitted from an AT over the air to one or more MPTs (or base stations). A MPC/MSC, which may include a well-known inter-working function (IWF), packet data serving node (PDSN), or packet control function (PCF), for processing data packets may exist between MPT/BS and the distributed network RAN 120. However, the requests may also be transmitted through the public switched telephone network (PSTN) to a carrier network 126. The carrier network 126 may receive the request and provide it to distributed network 120.

Figure 7:
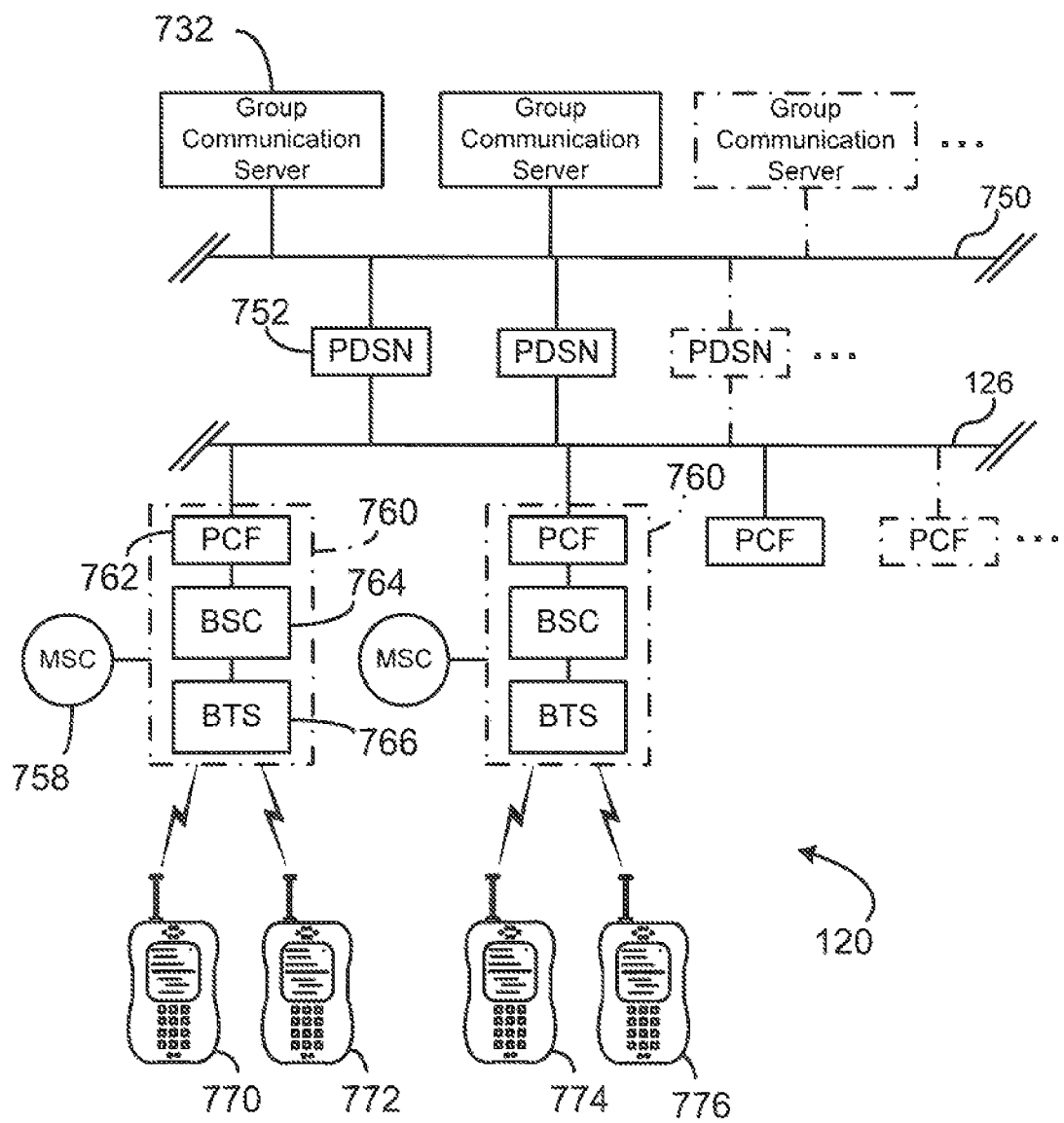
FIG. 7 is an illustration of a group communication system in accordance with at least one embodiment of the invention.

Referring to FIG. 7, one or more group communication servers 732 can monitor traffic of the group communication system through its connection to distributed network 120. Since group communication server 732 can be connected to the network 120 through a variety of wired and wireless interfaces, geographic proximity to group participants is not necessary. Typically, a group communication server 732 controls communications between the access terminals/wireless devices of group members (ATs 770, 772, 774, 776) in a PTT system. The wireless network illustrated is merely exemplary and can include any system whereby remote modules communicate over-the-air between and among each other and/or between and among components of a wireless network including, without limitation, wireless network carriers and/or servers. A series of group communication servers 732 can be connected to a group communication server LAN 750.

The group communication server(s) 732 can be connected to a wireless service provider's packet data service node (PDSN) such as PSDN 752, shown here resident on a carrier network 126. Each PSDN 752 can interface with a base station controller 764 of a base station 760 through a packet control function (PCF) 762. The PCF 762 may be located in the base station 760. The carrier network 126 controls messages (generally in the form of data packets) sent to a MSC 758. The MSC 758 can be connected to one or more base stations 760. In a similar manner to the carrier network, the MSC 758 is typically connected to the BTS 766 by both the network and/or Internet for data transfer and PSTN for voice information. The BTS 766 ultimately broadcasts and receives messages wirelessly to and from the wireless ATs, such as cellular telephones 770, 772, 774, 776, as is well known in the art. Accordingly, the details of a group communication system will not be further discussed.

As discussed in the foregoing, group members (e.g., ATs 770, 772, 774, 776) can utilize embodiments of the invention to increase the probability of a successful first transmission of an access probe thereby reducing the PTT latency and improving the system performance. Accordingly, an embodiment of the invention can include an access terminal comprising: logic configured to execute the methods of FIG. 6. Further, the invention is not limited to the specified embodiments. Accordingly, logic in the access terminal can be configured to perform any of the functions, algorithms, equations, sequences and/or actions discussed herein.

Additionally, a server (e.g., the group communication server, RAN, network device operably coupled to the communication network, or combinations thereof) can work cooperatively with the access terminal to increase the probability of a successful first transmission of an access probe. As used herein the term server is intended to be broadly construed as any device and/or combination of devices that are part of the wireless network or operably coupled to the wireless network that can perform the functions described herein. Accordingly, in one embodiment of the invention, a server can transmit the number of participants in a group call (e.g., channel load estimate–potential N) as part of the Announce Message, initial message to the access terminal or initial page. Additionally, the message could be configured to list the number of access terminals in a sector/cell that are designated as part of the group call. For example, this configuration can be useful when a QChat group call (or similar group communication) is placed using the multicast option. In general this information can be exploited for all group calls. Further, as discussed above, a server can provide a number of page arrivals (e.g., $r_s$) in a given sector during a Control Channel (CC) cycle s.

In general in multicast Group calls, if targets are spread across many sectors in a paging zone, a multicast call is not beneficial since there is no radio resource savings on the forward link. So it can be expected that multicast calls will typically be invoked whenever targets of the call are co-located within a few sectors. In fact multicast calls may also be restricted to pre-defined groups like public safety or construction site locations where users are likely to be highly co-located.

Assuming that a multicast Group call is invoked whenever at least one sector in the network is expected to have at least F targets in R contiguous sectors, the load on the access channel in a sector as a result of the multicast call can be determined by assuming K=F and M=R in the formula for the load determination algorithm, discussed in the foregoing sections. Since it is likely that K is large and M is small, the accuracy of the algorithm in predicting the load on the access channel improves significantly.

For example, in a multicast Group call, since the same Announce message is sent by the group communication server to the targets of the multicast call, the targets in a sector receive the same Announce message. Then, the targets of the multicast call that are in that sector will initiate access channel transmission procedures at the same time. As a result, the probability of a collision on the first access attempt is very high.

If the group communication server includes the total number of targets in the Group Call as part of the Announce message, the targets of the multicast call can infer the maximum load on the access channel as a result of this multicast call. Additionally, if the RAN is aware of the relative location of the targets of the Multicast call within a given group of contiguous sectors, the RAN could modify the number of targets in the Announce message further for targets that lie in that group of contiguous sectors. As a result, the peak load on the Access Channel for the multicast call is further refined. Knowledge of the average and peak load on the access channel as a result of the multicast call will allow targets of the multicast call to better characterize the instantaneous load on the access channel. For example, the maximum group members can be used as an upper limit bound for the peak load.

Further, a server (e.g., RAN) can specify the total number of sectors in its paging zone to the access terminal. The access terminal can use this information to determine an estimate of N based on the number of pages (which can be considered to be proportional to the number of calls including both direct calls as well as group calls) it sees on the Control Channel every paging cycle. If the server is configured to track the geographical location of access terminals at a finer granularity than a paging zone and transmit pages to a few sectors where the access terminal is most likely to be, then each access terminal can listen to pages on the Control Channel that are within its sector or in a neighboring sector. For example, the RAN can track access terminal at a finer granularity (e.g. 7~10 sectors) by letting the access terminal more frequently transmit its location (e.g., RouteUpdate messages). This location information can be used by the RAN to page access terminals or transmit any mobile terminated call set-up traffic to only a small group of sectors. This will result in the reduction of M (sectors) as used in the foregoing equations. This can further enhance the ability to estimate the channel load (N), which in turn can enhance the ability of the access terminal to accurately establish the backoff interval.

Accordingly, an embodiment of the invention can include a communication system comprising: a server including logic configured to transmit a channel load estimate; and an access terminal including logic configured to receive the channel load estimate; logic configured to determine a backoff interval based on the channel load estimate; logic configured to determine a random backoff time, wherein the backoff interval defines a range from which the random backoff time is selected; and logic configured to delay the transmission of an initial access probe for the random backoff time. As discussed above, the channel load estimate is a number of participants in a group call and can be transmitted in an initial communication from a server to an access terminal (e.g., in an initial page and/or an Announce Message).

Figure 8:
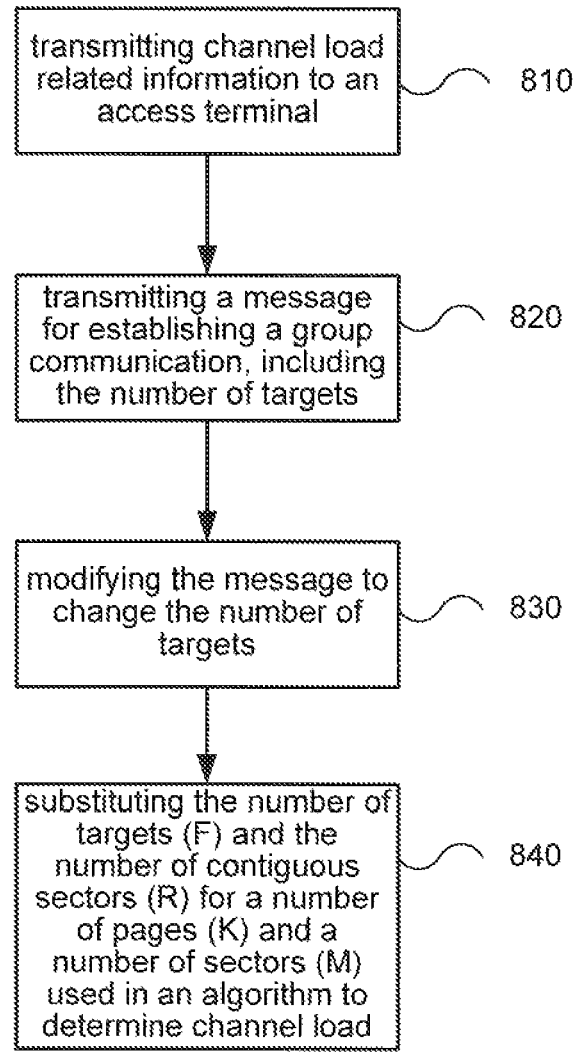
FIG. 8 is a flowchart of a method in accordance with at least one embodiment of the invention.

Additionally, an embodiment of invention can include methods of performing the sequence of actions, operations and/or functions previously discussed. For example, as illustrated in FIG. 8, at least one embodiment can include a method comprising transmitting channel load related information 810 to an access terminal. As discussed above, the channel load related information can be at least one of a number of page arrivals in a given sector, a number of members in a group, a number of members in a multicast group call, a number of targets, and a number of contiguous sectors containing the targets. The information can be transmitted as part of a group communication initiation message (e.g., Announce message), 820. Further, the group communication can be further modified to change the number of targets from a total number of targets to a number of targets within a limited number of contiguous sectors, 830. Still further, those skilled in the art will appreciate that the information from 830 or 810 can be used to substitute the number of targets (F) and the number of contiguous sectors (R) for a number of pages (K) and a number of sectors (M) used in an algorithm (e.g., as discussed in the foregoing description) to determine channel load at the access terminal.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

Accordingly, an embodiment of the invention can include a computer readable media embodying methods in accordance with the methods, algorithms, steps and/or functions disclosed herein. For example, embodiments of the invention can include a computer readable media embodying a method in a wireless communication system, the method comprising: estimating a channel load based on a number of load related messages on a control channel in a predetermined interval. Additional aspects described herein can also be included in the computer readable media embodying the method, such as determining a backoff interval based on the estimated channel load; determining a random backoff time, wherein the backoff interval defines a range from which the random backoff time is selected; and delaying the transmission of an initial access probe for the random backoff time. Accordingly, embodiments of computer readable media embodying methods in accordance with the methods, algorithms, steps and/or functions disclosed herein is not limited to these examples.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method comprising:
   receiving at a wireless device signals transmitted on a control channel including load related messages;
   determining a probability of targets (j) in a sector based in part on a number of pages (K) included in the load related messages; and
   estimating a channel load based on the determined probability of targets in the sector, wherein the probability (Pr) of targets (j) in the sector from a number of sectors (M) in a paging zone is determined as:

$$Pr(J = j \| j \geq 1) = \left(\frac{1}{1-\left(1-\frac{1}{M}\right)^K}\right)\left\{\frac{K!}{j!(K-j)!}\left(\frac{1}{M}\right)^j\left(\frac{M-1}{M}\right)^{K-j}\right\}.$$

2. The method of claim 1, further comprising:
   determining an expected number of targets in a designated sector.

3. A method comprising:
   receiving at a wireless device signals transmitted on a control channel including load related messages;
   determining a probability of targets (j) in a sector based in part on a number of pages (K) included in the load related messages; and
   estimating a channel load based on an expected number of targets using the determined probability of targets in the sector, wherein the expected number of targets ($E_{avg}^{targ}$) is determined as:

$$E_{avg}^{targ} = 1 + \left(\frac{1}{1-q^K}\right)\left\{\sum_{j=2}^{K} jPr(J = j\|j \geq 1)\right\}$$

$$= \frac{K}{M}\left(1 - \frac{q^{K-1}}{1-q^K}\right),$$

where q=1−1/M and M is number of sectors in a paging zone and Pr is the probability of targets (j) in the sector from the number of sectors (M) in a paging zone.

4. A method comprising:
   receiving at a wireless device signals transmitted on a control channel including load related messages;
   determining a probability of targets (j) in a sector based in part on a number of pages (K) included in the load related messages; and
   estimating a channel load based on the determined probability of targets in the sector, wherein the probability (P) is determined as:

$$P(J_{s+1} = j\|j \geq 1; p_{s+1}) = \left(\frac{1}{1-(q_{s+1})^K}\right)\left\{\frac{K!}{j!(K-j)!}(p_{s+1})^j(q_{s+1})^{K-j}\right\}$$

and $q_{s+1}=1-p_{s+1}$, where $p_{s+1}$ is an average probability of arrival during Control Channel (CC) cycle s+1.

5. The method of claim 4, wherein $r_s$ is a number of page arrivals in a given sector during a Control Channel (CC) cycle s, $K_s$ is a total number of pages that arrive during CC cycle s, and $p_{s+1}$ given as:

$$p_{s+1} = \frac{1}{s}\left(\sum_{i=1}^{s}\frac{r_s}{K_s}\right).$$

6. The method of claim 5, wherein $r_s$ is provided by a radio access network to access terminals in the sector.

7. The method of claim 4, wherein the value of $p_{s+1}$ is determined using an auto-regressive moving average (ARMA) technique.

8. The method of claim 7, wherein the ARMA technique is given as:

$$p_{s+1} = \alpha p_s + (1-\alpha)\left(\frac{r_s}{K_s}\right),$$

where α is a scalar value defined as 0≤α≤1.

9. The method of claim 4, wherein an expected number of targets ($E_{avg}^{targ}$) is determined as:

$$E_{avg}^{targ} = E_{avg}^{targ,s+1}$$

$$= \left(\frac{1}{1-(q_{s+1})K}\right)\left\{\sum_{j=2}^{K} jP(J_{s+1} = j\|j \geq 1; p_{s+1})\right\}$$

$$= \frac{K}{M}\left(1 - \frac{(q_{s+1})^{K-1}}{1-(q_{s+1})^K}\right).$$

10. A method comprising:
    receiving at a wireless device in a sector, signals transmitted on a control channel including load related messages; and
    determining a load on an access channel due to access terminal originated calls in the sector,
    wherein the load due to access terminal originated calls ($E_{avg}^{orig}$) is determined as:

$$E_{avg}^{orig} = W\lambda T_{acc}$$

where λ is a rate of calls per second, $T_{acc}$ is a duration of an access cycle is in seconds and W is a number of access terminals registered within the sector.

11. The method of claim 10, wherein the load related messages include a number of synchronous control channel (SCC) packets received every page interval.

12. The method of claim 10, wherein determining the load is based on a sum of the load due to received pages $E_{avg}^{targ}$ and the load due to access terminal originated calls $E_{avg}^{orig}$.

13. A method comprising:
    receiving at a wireless device in a sector signals transmitted on a control channel including load related messages; and
    determining a load on an access channel due to access terminal originated calls in the sector,
    wherein determining the load includes a compensation for an average number of retransmissions (RT) over the access channel, then a total load on the access channel ($E_{avg}^{total}$) can be determined as:

$$E_{avg}^{total} = [(1+RT)*(E_{avg}^{targ}+E_{avg}^{orig})]$$

where ($E_{avg}^{orig}$) is the load due to access terminal originated calls and $E_{avg}^{targ}$ is the load due to received pages.

14. The method of claim 13, wherein the access channel load (N) estimate is determined as:

$$N = E_{avg}^{total}.$$

15. An apparatus comprising:
    means for receiving at a wireless device in a sector, signals transmitted on a control channel including load related messages; and
    means for determining a load on an access channel due to access terminal originated calls in the sector,
    wherein the load due to access terminal originated calls ($E_{avg}^{orig}$) is determined as:

$$E_{avg}^{orig} = W\lambda T_{acc}$$

where $\lambda$ is a rate of calls per second, $T_{acc}$ is a duration of an access cycle in seconds and W is a number of access terminals registered within the sector.

16. The apparatus of claim 15, wherein the means for determining the load uses a sum of the load due to received pages $E_{avg}^{targ}$ and the load due to access terminal originated calls $E_{avg}^{orig}$.

17. The apparatus of claim 15, wherein the load related messages include a number of synchronous control channel (SCC) packets received every page interval.

18. An apparatus comprising:
    logic configured to receive at a wireless device in a sector, signals transmitted on a control channel including load related messages; and
    logic configured to determine a load on an access channel due to access terminal originated calls in the sector,
    wherein the load due to access terminal originated calls ($E_{avg}^{orig}$) is determined as:

$$E_{avg}^{orig} = W\lambda T_{acc}$$

where $\lambda$ is a rate of calls per second, $T_{acc}$ is a duration of an access cycle in seconds and W is a number of access terminals registered within the sector.

19. The apparatus of claim 18, wherein the logic configured to determine the loads uses a sum of the load due to received pages $E_{avg}^{targ}$ and the load due to access terminal originated calls $E_{avg}^{orig}$.

20. The apparatus of claim 18, wherein the load related messages include a number of synchronous control channel (SCC) packets received every page interval.

21. A non-transitory computer-readable medium containing instructions stored thereon, which, when executed by one or more processors are configured to determine channel load, the non-transitory computer readable medium comprising:
    at least one instruction to receive at a wireless device in a sector signals transmitted on a control channel including load related messages; and
    at least one instruction to determine a load on an access channel due to access terminal originated calls in the sector,
    wherein the load due to access terminal originated calls ($E_{avg}^{orig}$) is determined as:

$$E_{avg}^{orig} = W\lambda T_{acc}$$

where $\lambda$ is a rate of calls per second, $T_{acc}$ is a duration of an access cycle in seconds and W is a number of access terminals registered within the sector.

22. The non-transitory computer-readable medium of claim 21, wherein at least one instruction to determine the load uses a sum of the load due to received pages $E_{avg}^{targ}$ and the load due to access terminal originated calls $E_{avg}^{orig}$.

23. The non-transitory computer-readable medium of claim 21, wherein the load related messages include a number of synchronous control channel (SCC) packets received every page interval.

* * * * *